(No Model.)

A. PHILIPP.
BEET HARVESTER.

No. 552,444. Patented Dec. 31, 1895.

WITNESSES:
M. D. Blondel
Amos W. Hart

INVENTOR
Albert Philipp
BY Munn & Co.
ATTORNEYS.

UNITED STATES PATENT OFFICE.

ALBERT PHILIPP, OF STANTON, NEBRASKA.

BEET-HARVESTER.

SPECIFICATION forming part of Letters Patent No. 552,444, dated December 31, 1895.

Application filed March 8, 1895. Serial No. 541,025. (No model.)

*To all whom it may concern:*

Be it known that I, ALBERT PHILIPP, of Stanton, in the county of Stanton and State of Nebraska, have invented a new and useful Improvement in Beet-Harvesters, of which the following is a specification.

My invention is an improvement in that class of beet-harvesters which are adapted for first cutting off the projecting tops of the beets and then removing the bodies of the same from the ground.

The construction and operation of the machine are as hereinafter set forth, and shown in accompanying drawings, in which—

Figure 1:
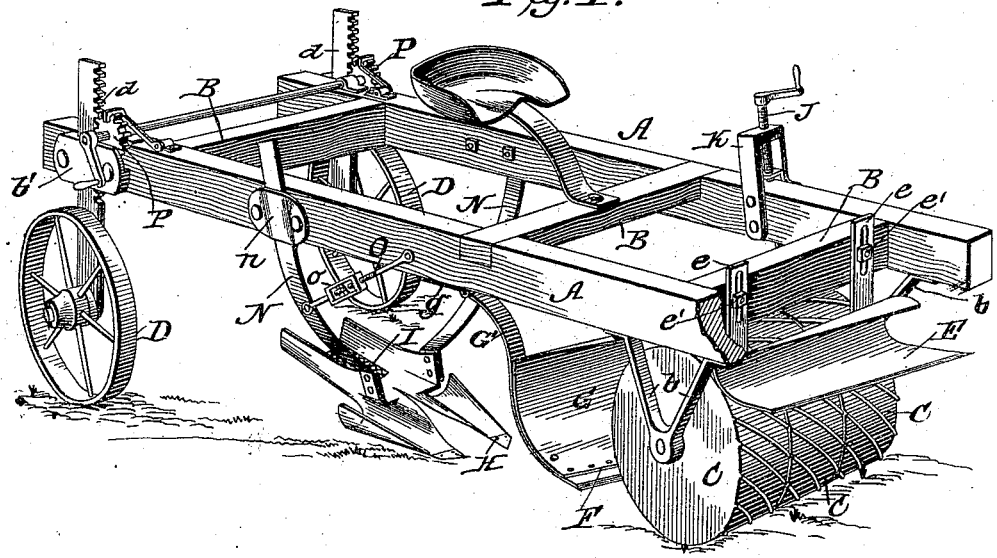
Figure 2:
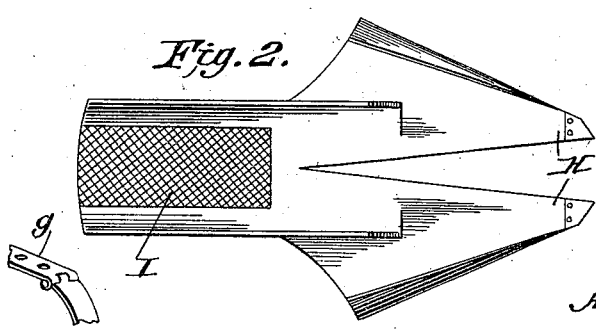
Figure 3:
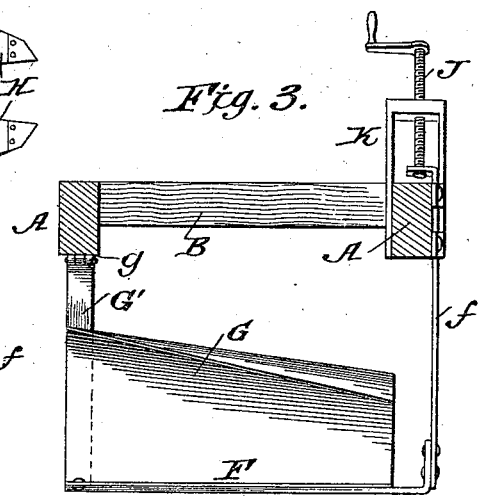
Figure 4:
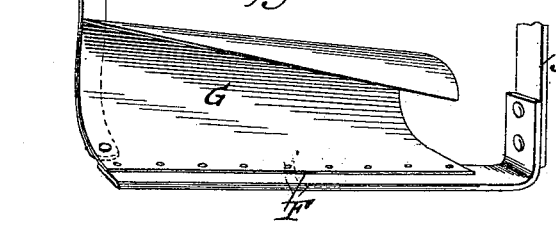
Figure 5:
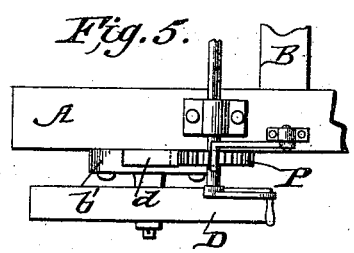

Figure 1 is a perspective view of the machine. Fig. 2 is a plan view of the digger and screen. Fig. 3 is a transverse vertical section of the machine on a line between the front rollers and the second or rear cutter. Fig. 4 is a perspective view of the second or rear cutter detached. Fig. 5 is a plan view showing a detail.

The oblong rectangular frame of the machine is composed of two parallel side bars A and three connecting cross-bars B. The front end of the frame is supported by three broad-tread rollers or wheels C and the rear end by two narrow-tread wheels D. A cutter E is arranged on the front of the frames A B, and a second cutter F is placed in rear of the broad-tread wheels C and provided with an upwardly-curved apron G. Following said knife and apron are two diggers H, having a sifter or riddle I attached.

I will now describe the above-named parts more in detail, and also their respective functions.

The front wheels or rollers C are mounted on a transverse axle, supported in hangers *b*, pendent from the side bars A of the frame. Their broad faces or treads are provided with oblique ribs, to adapt them to take a firm hold on the surface over which they pass, so that as the machine is drawn forward by animal or other power the wheels travel on the beet-bed and rotate by reason of their friction with such surface.

The front knife or cutter E is secured to a bar *e*, which is attached vertically to the front cross-bar B by means of a clamping-bolt *e'*, which passes through a slot in bar *e* and permits its vertical adjustment. Said knife E is curved spirally upward from front to rear, substantially like the moldboard of a plow, and its cutting-edge is inclined rearward toward the right-hand side of the frame. The function of this cutter E is to sever the tops of those beets which project to an unusual height above the ground, and its described spiral curvature causes the lateral discharge of the beet-tops thus cut off, so that they are not deposited on the beet-bed.

The rear cutter or knife F is straight, and arranged obliquely directly behind the wheels C and close to the ground. Its vertical shank *f* extends upward alongside the left-hand side bar A of the frames, and is adjusted vertically by means of a crank-screw J, which works vertically in a bracket K, affixed to the frame. The function of this cutter F is to sever the tops of beets within two inches of the ground, since any portion above that is rejected at the factories as practically worthless for producing sugar.

The apron G serves as a means for catching and discharging laterally the beet-tops severed by such knife. It is constructed of sheet metal, curved upward spirally, and rigidly attached to the knife proper by means of bolts or rivets.

To brace that end of knife F to which the discharge end of apron G is attached, I employ an upwardly-curved bar G', whose lower end is pivoted to the apron, as shown best in Fig. 4. The upper end of said bar G' is joined to a short piece *g'*, having a series of holes to receive a screw-bolt that passes through one of the longitudinal beams of the frame. Such construction adapts the bar G' for longitudinal adjustment corresponding to the vertical adjustment of the knife F.

The combined digger and sifter or riddle is constructed as follows: The digger proper is composed of two shares or diggers H, and the riddle I is in rear of them. The shares are arranged side by side, their inner edges being separated by a space or open slot, of substantially V shape. These diggers enter the ground at the required angle and lift out the beets, which then pass rearward, along with more or less adhering soil, onto the sifter or riddle. The latter is a trough-like screen or grating, which permits the soil to pass through and thus become separated from the beets, that then roll off upon the ground and lie exposed, so that they may be easily seen and gathered into baskets, &c.

The standards N of the diggers are held to the side bars A by clamps $n$, which permit their individual adjustment higher or lower relative to the frame. Tension-rods O, provided with turnbuckles $o$, are arranged diagonally, in connection with said standards N, for the purpose of sustaining the draft-strain and adjusting the diggers farther forward or back, as conditions may require.

The rear transporting-wheels D are held adjustably in clamps $b'$. Pinions P engage said rack-bars and are rotated by a clamp and axle, as shown, for adjusting the wheels D higher or lower, as required to gage the depth at which the diggers run in the ground.

By the above-described construction and arrangement of parts I provide a machine which is at once simple and light, yet strong and cheap, and very efficient in operation.

What I claim is—

1. In a beet-harvester, the combination with a carrying frame of the rear knife or cutter for severing the tops of beets, which is curved spirally upward, for the purpose of causing lateral discharge of the severed beet tops, as shown and described.

2. In a beet-harvester, the combination with a carrying frame and knife or cutter, whose edge is inclined rearward, of an apron attached to the latter, and curved spirally upward its greatest width and curvature being adjacent to the rear end of the cutter as shown.

3. In a beet-harvester, the combination with the carrying frame of a digger which is vertically adjustable and whose two parts are separated by an open V-shape slot, and a riddle or screen attached to said digger and forming the rear projecting portion of the same, as shown and described.

4. In a beet-harvester, the combination with the frame and sets of front and rear transporting wheels, of the combined diggers and riddle, located between said sets of wheels, and having two standards as specified, clamps on the frame in which the standards are held adjustably, and tension rods or braces arranged obliquely and having devices for adjusting their length, as shown and described.

5. In a beet-harvester, the combination with the frame and front transporting wheels, the diggers and riddle arranged in rear of the latter, and the rear transporting wheels, rack-bars on which they are journaled, clamping keepers in which the said bars are held adjustably, a crank shaft and pinions engaging the rack bars as shown and described.

ALBERT PHILIPP.

Witnesses:
HARRISON H. ANTLES,
GEORGE A. EBERLY.